(12) United States Patent
Wong et al.

(10) Patent No.: US 8,205,172 B2
(45) Date of Patent: Jun. 19, 2012

(54) GRAPHICAL WEB BROWSER HISTORY TOOLBAR

(75) Inventors: Curtis G. Wong, Medina, WA (US); Steve C. Glenner, Bellevue, WA (US); Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 11/097,720

(22) Filed: Mar. 31, 2005

(65) Prior Publication Data
US 2006/0224997 A1    Oct. 5, 2006

(51) Int. Cl.
*G06F 3/048* (2006.01)
(52) U.S. Cl. ......... 715/855; 715/704; 715/738; 715/838
(58) Field of Classification Search .................. 715/733, 715/738, 751, 760, 838, 855, 704
See application file for complete search history.

(56) References Cited

U.S. PATENT DOCUMENTS

| | | | | |
|---|---|---|---|---|
| 6,133,916 A * | 10/2000 | Bukszar et al. | ............... | 715/744 |
| 6,415,316 B1 * | 7/2002 | Van Der Meer | ............... | 709/203 |
| 7,069,506 B2 * | 6/2006 | Rosenholtz et al. | .......... | 715/526 |
| 2003/0095139 A1 * | 5/2003 | Davidsson | .................... | 345/700 |
| 2003/0233425 A1 * | 12/2003 | Lyons et al. | .................. | 709/217 |
| 2004/0003351 A1 * | 1/2004 | Sommerer et al. | ............ | 715/517 |

OTHER PUBLICATIONS

"How to . . . Manage Favorites & Bookmarks" by Monique Cuvelier, Customize Apr. 2000, vol. 6 Issue 4 http://www.smartcomputing.com/Editorial/article.asp?article=articles/archive/l0604/63l04/63I04.asp&guid=, hereinafter Cuvelier.*

* cited by examiner

*Primary Examiner* — Sara England (57) ABSTRACT

The present subject matter describes a graphical web browser toolbar the stores visual representations of user-selected web pages. A saved page is included in the toolbar as a tile that shows a thumbnail image of at least a portion of the page. A user may customize the thumbnail image by zooming onto an area of the page. The user selects a tile from the toolbar to show an enlarged version of the thumbnail image with data from the web page, such as a link to the web page. A comments section allows a user to enter comments related to the web page into the tile. Tiles may be arranged according to groups as configured by the user. The toolbar may be stored and transmitted to a remote location. Using the described techniques, a web shopper can save images in a graphical toolbar and send items saved therein to an acquaintance.

8 Claims, 10 Drawing Sheets

GRAPHICAL WEB BROWSER HISTORY TOOLBAR

TECHNICAL FIELD

The following description relates generally to distributed network computing systems and methods. More particularly, the following description relates to user interface tools for web browsers.

BACKGROUND

The advent of the Internet and the proliferation of tools for use therewith has provided simple access to a virtually unlimited amount of information. Users can access web sites to obtain educational information, consumer information, technical data, digital images, etc. Usually, users access multiple pages in an effort to collect information from more than one source. For example, when shopping for a particular item a user may visit several retail web sites to compare various products. When accessing several websites, however, it can become somewhat difficult to keep track of websites visited and which particular information has come from which particular website. For instance, if a user is shopping for a kitchen faucet, the user may visit several websites to compare features and prices of several faucets. It may be a problem for the user to remember which website advertised a certain faucet or the prices advertised by each website.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Overview

The presently described subject matter provides a convenient way to collect web pages and related information while browsing the Internet (or some other network system). Using the techniques described herein, a user can easily save information including: a link to a web page; a thumbnail image related to the web page; a title of the web page; information from the web page; metadata associated with the web page; and user comments regarding the web page.

This and other related information is saved in a graphical toolbar so that it can easily be recalled by the user during the browsing session or saved for later access. Each individual web page is represented as a tile on the graphical toolbar with a thumbnail image of the web page shown in the tile. The information (i.e. the toolbar) can also be electronically transmitted to one or more other users so that the same collected and organized information can be viewed at a remote location.

In at least one implementation described herein, the information appears as a graphical toolbar in a column along an edge of a display screen. When new web pages are selected for addition to the graphical toolbar, they appear at the bottom of the stack thereby providing a logical order to the toolbar related to the order in which the web pages were selected.

In at least one described implementation, a number of tiles (i.e. web pages) can be put together to form a group within the graphical toolbar. A group is similar to a folder of saved pages. A separate column of the graphical toolbar may be used to display the different groups. Smaller thumbnail images may be used under a group heading to identify the web pages that make up the group. A user can name each group and can drag (move or copy) thumbnails between groups.

One scenario in which the graphical toolbar can be useful is online shopping. Using the techniques described herein, a user can browse several web sites for one or more specific items. If the user decides to save a particular web page, the user can add the web page to the graphical toolbar to create a tile in the graphical toolbar that utilizes a thumbnail image of the web page. A link to the page is saved and may be displayed together with a tile of the page. The user may then select page information that is saved with the tile. For example, the user can click on a price to capture the price into the tile. User comments can also be added to the tile and are saved with the other information.

In at least one implementation described herein, a user can gather comparable items from a variety of sites and display the items in a summary display. In the shopping example noted above, the prices from each web page may be summarized in a single display. In addition, a user may select several prices from the summary to create a total of selected prices.

The thumbnail image used in a tile of the graphical toolbar can be a full image of the web page or it can be selected by a user. If, for example, a user is interested in a particular item on the web page (such as a faucet), then the user may wish to crop the web page image so that the thumbnail image includes only the faucet which is of interest to the user. Similarly, the user can resize a thumbnail image after the image been saved.

Exemplary Graphical Web Browser History Toolbar

Figure 1:
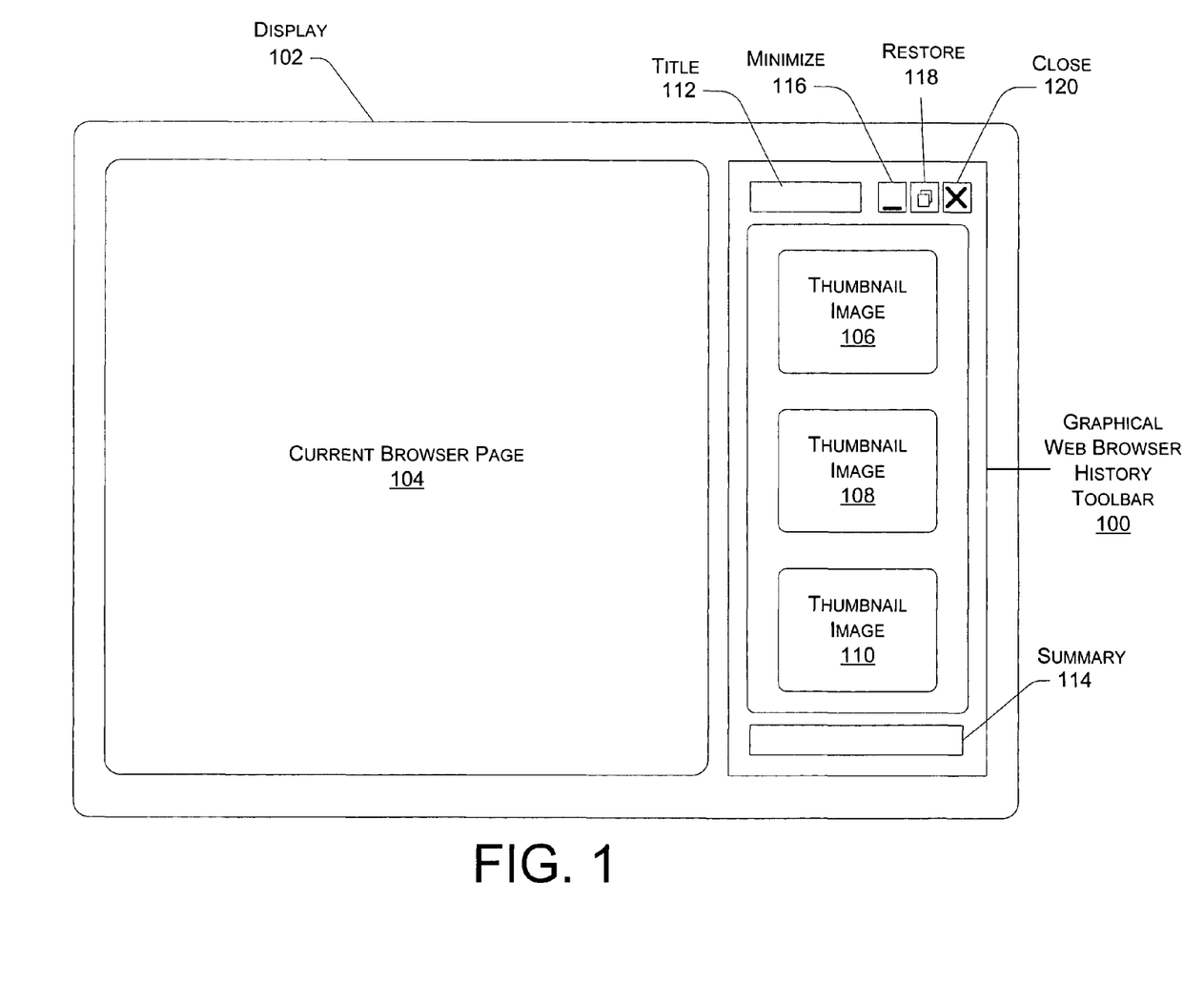
FIG. 1 is an illustration of an exemplary graphical web browser history toolbar.

FIG. 1 is an illustration of an exemplary graphical web browser history toolbar 100 in accordance with one or more implementations described herein. The graphical web browser history toolbar 100 (hereinafter "graphical toolbar") is shown in the context of a display 102 that displays a current browser page 104.

The graphical toolbar 100 is shown as having thumbnail image 106, thumbnail image 108 and thumbnail image 110. Each thumbnail image 106-110 is a representation of a web page that a user has saved in the graphical toolbar 100. For the present example, thumbnail image 110 is a smaller representation of the current browser page 104, indicating that a user has saved the current browser page 104 in the graphical toolbar 100.

A web page can be saved in the graphical toolbar 100 in any of several ways known in the art. For example, a user may right-click a mouse pointing device on a web page to exhibit a menu that includes an option to save the current web page to the graphical toolbar. In an alternate implementation, an option may be provided on a web browser toolbar to allow a user to save a web page into the graphical toolbar.

The graphical toolbar 100 as shown includes a title field 112 which displays a title related to the subject matter of the contents of the graphical toolbar 100. The user may provide any title that is helpful to reference the thumbnail images 106-110. For example, if the user is shopping for a faucet, the user may save several web pages that display a faucet and enter a title of "faucet" in the title field 112.

The graphical toolbar 100 also includes a summary field 114 in which a summary of one or more particular aspects of the web pages represented in the graphical toolbar appears. For example, a user may wish to select a price from each web page represented in the graphical toolbar and have a total of the prices appear in the summary field 114.

The title field 112 and the summary field 114 are optional and certain functions of the graphical web browsing history toolbar 100 may be implemented without a title field 112 and/or a summary field 114. Further functionality of the graphical toolbar 100 including one or more implementations including the title field 112 and the summary field 114 are described in greater detail below.

Exemplary Web Browser/Graphical Toolbar Display

Figure 2:
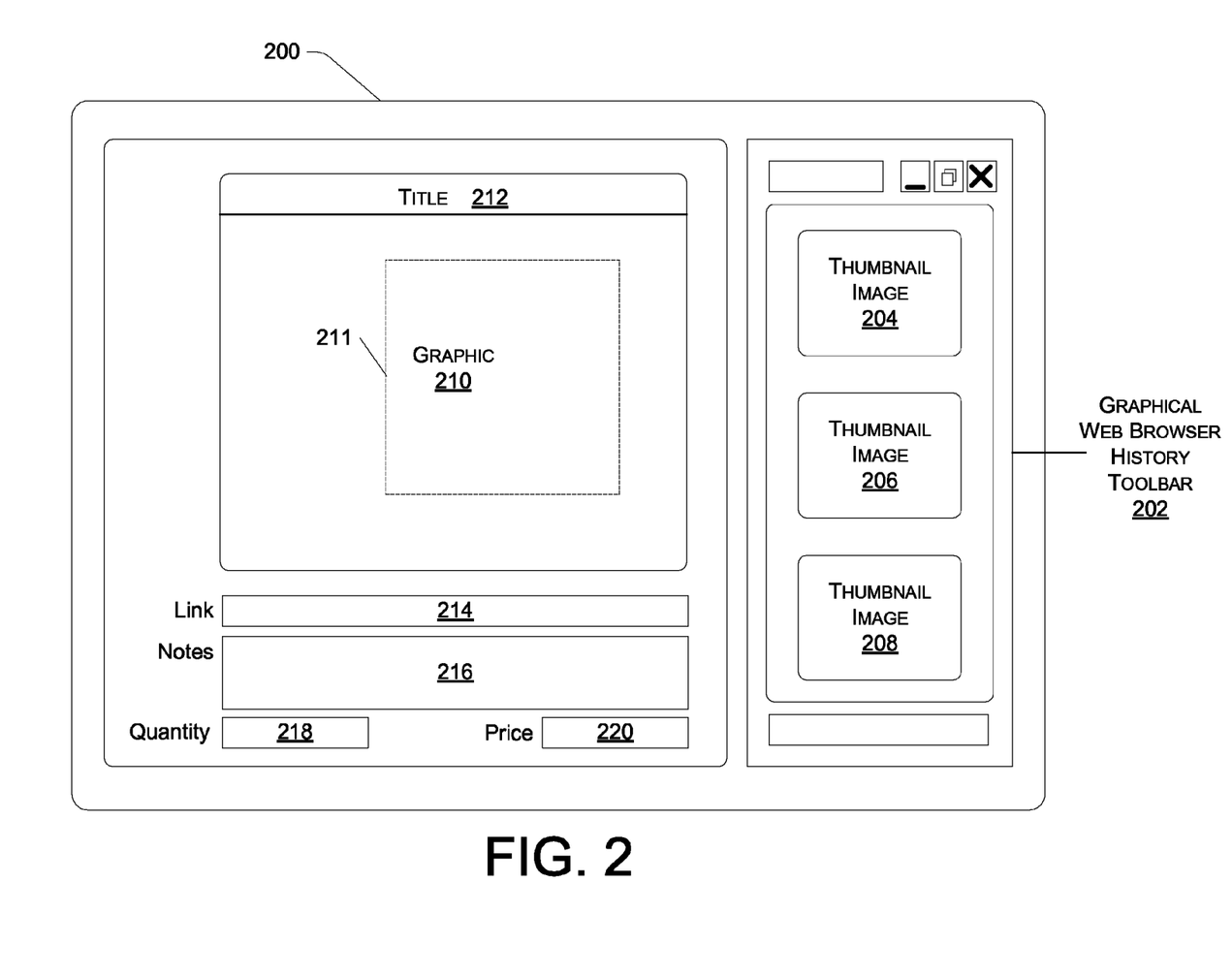
FIG. 2 is an illustration of an exemplary web browser display with a graphical web browser history toolbar.

FIG. 2 is an illustration of an exemplary web browser display 200 with a graphical web browser history toolbar 202 (hereinafter "graphical toolbar 202") included therein. The graphical toolbar 202 is similar to the graphical toolbar 100 shown in FIG. 1 and contains similar elements, including thumbnail image 204, thumbnail image 206 and thumbnail image 208. The exemplary web browser display 200 is shown as it would appear when a user takes an action to save a current web page in the graphical toolbar 202. Or, the appearance is similar to how the display would appear when a tile from the graphical toolbar 202 is clicked to recall a saved web page.

A graphic 210 is shown on the web browser display 200 and displays the saved web page or a portion of the saved web page if the user has selected only a portion of the web page (shown by element 211) to be saved in the graphical tool bar 202. A title 212 assigned to the graphic 210 appears on the web browser display 200. The title 212 may be automatically taken from the save web page or it may be entered by a user.

A link 214 to the saved web page is shown appearing in the web browser display 200. The link 214 may be active so that selection of the link 214 will navigate a user to the website from which the graphic 210 has been taken. A notes field 216 contains comments entered by a user. The comments relate to items of interest to the user that the user may wish to recall when reviewing the graphic 210.

In this exemplary implementation, a quantity field 218 and a price field 220 are included on the web browser display 200. The user may populate the price field 220 by selecting a price that appears on the web page from which the graphic is taken. A user may change a value in the quantity field 218 to indicate a quantity of the displayed item in which the user is interested. The price field 220 may be keyed to the quantity field 218 so that changing a value in the quantity field 218 changes a value in the price field 220 to indicate a total price of the number of items identified in the quantity field 218.

Many of the elements shown and described in relation to FIG. 2 are optional and may be included or excluded from the web browser display 200 and the graphical toolbar 202. In addition, some modifications may be made to the identified elements without departing from the scope of the present discussion.

Exemplary Graphical Web Browser History Toolbar with Groups

Figure 3:
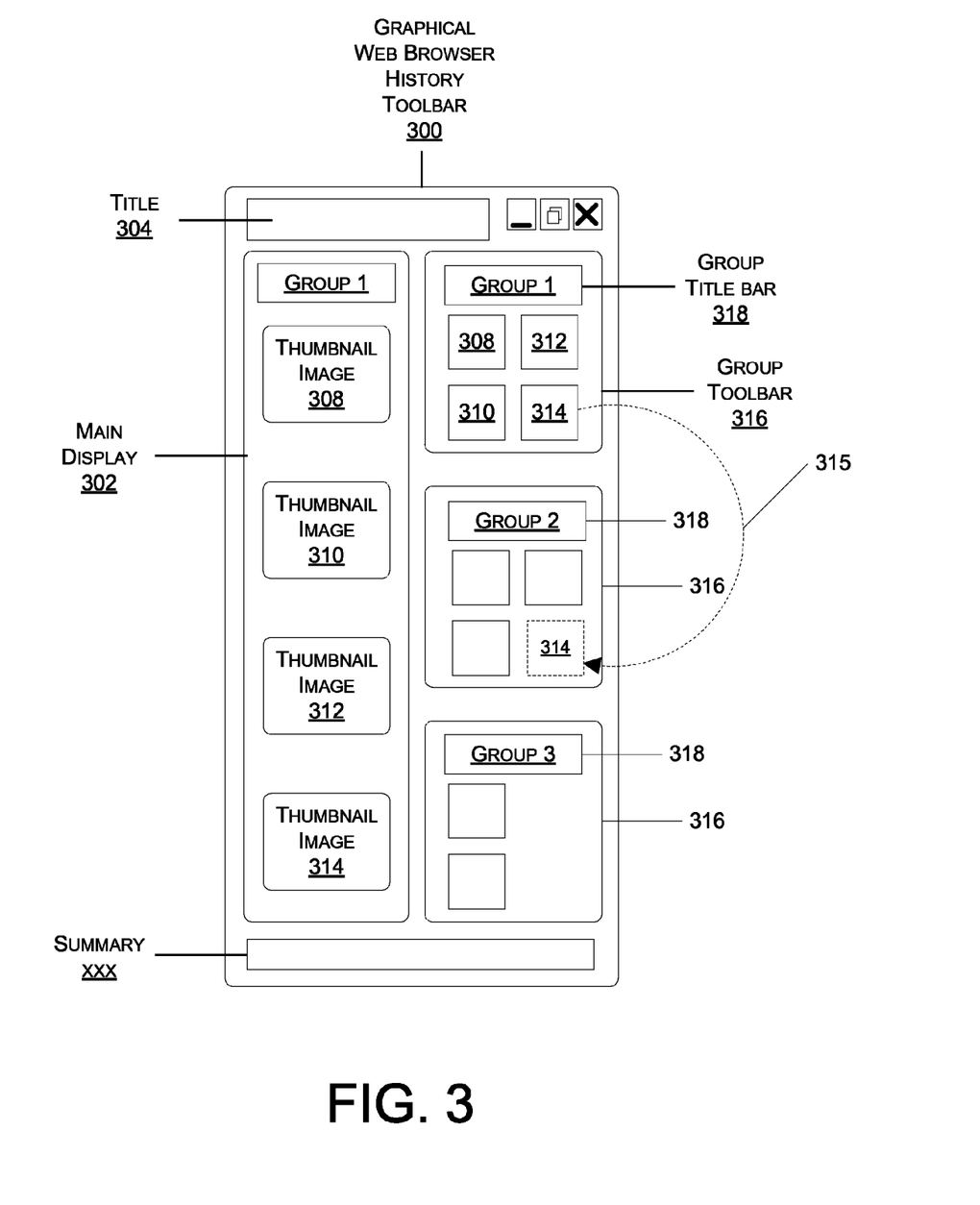
FIG. 3 is a depiction of an exemplary graphical web browser history toolbar with groups.

FIG. 3 is a depiction of an exemplary graphical web browser history toolbar 300 with groups. In the following discussion of FIG. 3, continuing reference is made to certain elements and reference numerals shown in one or more previous figures. As with previous figures, FIG. 3 is exemplary and certain elements are shown therein by way of example only, and not by way of limitation.

Groups can be used to organize related tiles so that browsing saved web pages is easier. A user may create a group and add one or more web pages to the group as tiles. A title may be added to each group to more easily identify the contents of each group.

The graphical web browser history toolbar 300 (hereinafter "graphical toolbar 300") includes a main display 302 that highlights a currently selected group. The graphical toolbar 300 also includes a title field 304 and a summary field 306 similar in form and function to the title 112 and summary 114 of FIG. 1. In one particular implementation, the title 112 and summary 114 relate to the highlighted group and will change when the highlighted group changes.

A main display 306 highlights a currently selected group. The main display 306 is basically identical to the graphical web browser history toolbar (FIG. 1, 100; FIG. 2, 202) shown in previous figures in that it includes tiles 308, 310, 312, 314 containing at least thumbnail images of web pages that have been saved in the graphical toolbar 300. In addition to a thumbnail image, a tile may include other information such as a web page link, user annotations, etc.

The graphical toolbar 300 also includes one or more individual group toolbars 316 corresponding to each group created by the user for saving web pages. Each group toolbar 316 includes a group title bar 318 that displays a title assigned to the group. Each group toolbar 316 includes miniature versions of thumbnail images taken from web pages that have been saved in the respective groups.

In the example shown, the main display 302 shows the tiles 308-314 for "Group 1." Smaller versions of the tiles 308-314 are shown in the group toolbar 316 that corresponds to "Group 1." Likewise, other group toolbars 316 (e.g. a group toolbar for "Group 2" and a group toolbar for "Group 3") display miniature versions of tiles (including thumbnail images) taken from web pages that are included in the groups that correspond to the group toolbars. In the present example, the group toolbar 316 entitled "Group 2" includes three (3) miniature tiles and the group toolbar 316 entitled "Group 3" includes two (2) miniature tiles. Also illustrated is the ability of the user to move tiles between groups, as shown by arrow 315 and tile 314 (shown in phantom).

Although generic titles are given to the group toolbars 316 in the present examples, a user may create any title for the group toolbars. For example, the group title bar 318 that reads "Group 1" may instead read "Faucets" if the saved images relate to faucets for which the user may be shopping. Similarly, the group title bar 318 that reads "Group 2" in the present example may be changed by a user to read "Printer Specs" if the saved images relate to specifications for printers.

Specific mechanisms for changing particular groups in and out of the main display 302 are not described in detail here. Several ways for accomplishing this task are known in the art and any practical manner for doing so may be employed in this environment. One technique that could be used is to include icons (not shown) in each group toolbar 316 for maximizing and minimizing the individual group toolbars 316. When a group toolbar 316 is maximized, the group appears in the main display 302. When a group toolbar 316 appearing in the main display 320 is minimized, it reverts to being displayed only in the group toolbar capacity.

Exemplary Computing Device

Figure 4:
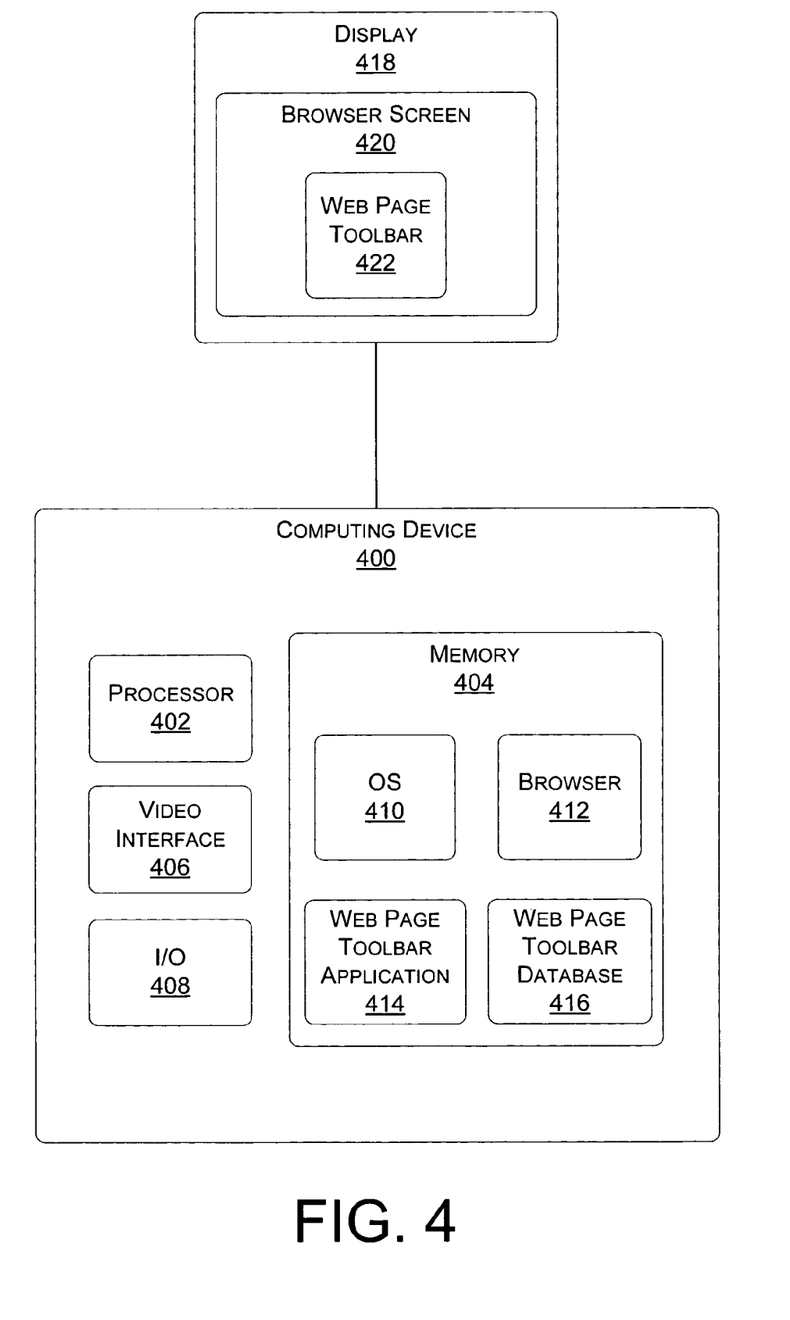
FIG. 4 is a block diagram of an exemplary computing device having a graphical web browser history toolbar application.

FIG. 4 is a block diagram of an exemplary computing device 400 on which the presently described graphical web browser history toolbar techniques may be executed. The block diagram is a simplified depiction that provides a general computing environment for the presently described methods.

The computing device 400 includes a processor 402 and memory 404, said memory 404 storing instructions that are executable on said processor 402. The computing device 400 also includes a video interface 406 (such as a video card) and an input/output (I/O) module 408 which enables data to be transmitted from and received by the computing device 400.

The memory 404 stores an operating system 410 that governs basic functionality of the computing device 400 and its interaction with peripheral devices. A web browser 412 is stored in the memory 404 and enables the computing device 400 to be used to communicate over a network (not shown) such as the Internet.

A web page toolbar application 414 is stored in the memory 404 and is configured to provide the functionality for the graphical web browser history toolbars shown and described in relation to previous figures herein. The memory 404 also stores a web page toolbar database 416 that stores data associated with the previously shown and described graphical web browser history toolbars. Such data includes, but is not limited to, stored web pages and/or portions thereof, web page data, web page metadata, user comments associated with saved web pages, and the like.

The computing device 400 communicates with a display 418 that is capable of displaying a web browser screen 420. A web page toolbar 422 similar to the graphical web browser history toolbars shown and described above can be displayed on the browser screen 420 by the web page toolbar application 414.

Other miscellaneous hardware and software modules (not shown) are also included in the computing device 400 and the display 418 that are necessary to carry out some of the collateral functionality required for practical implementation of the techniques described herein as well as other typical computing functionality. Some such hardware and software modules are shown and described in greater detail below, with respect to FIG. 9.

Exemplary Tile Object

Figure 5:
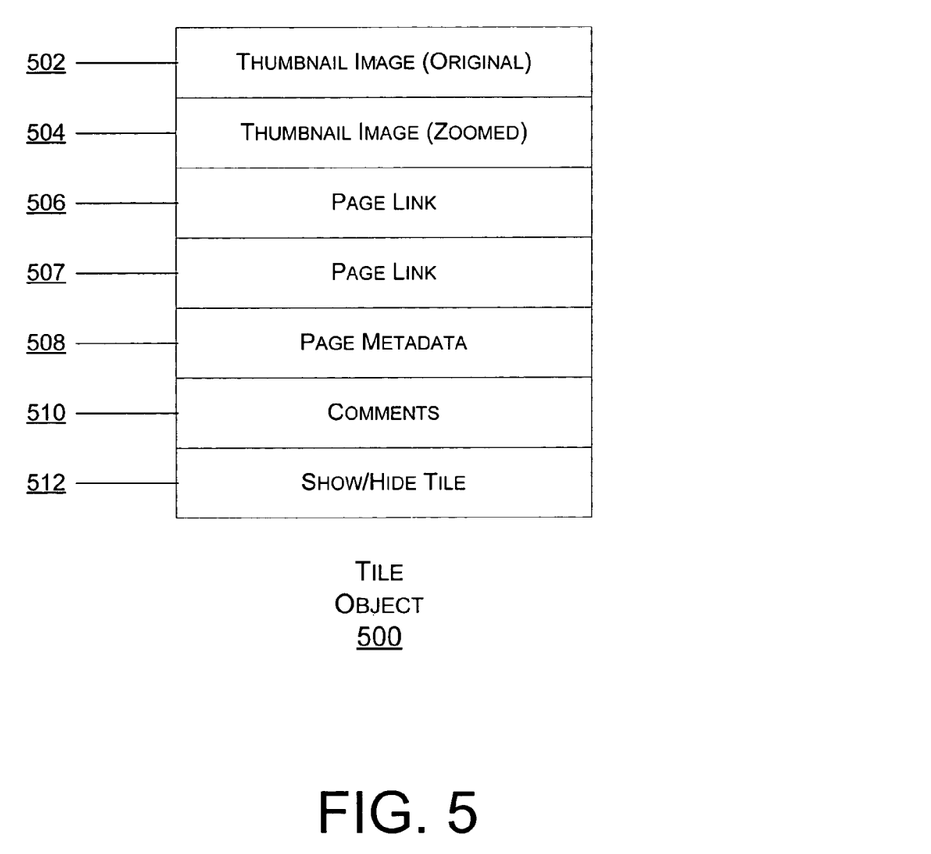
FIG. 5 is a representation of an exemplary tile object.

FIG. 5 is a representation of an exemplary tile object 500 in accordance with the present description. In the following description of FIG. 5, continuing reference is made to elements and reference numerals included in previous figures.

The exemplary tile object 500 includes an original thumbnail image 502 and a zoomed thumbnail image 504. When a web page is originally saved in a graphical toolbar, the entire web page appearance is saved as the thumbnail image. However, a user may wish to feature a smaller portion of the web page in the graphical toolbar.

In the previous example of a user shopping for faucets, the user may wish to crop out most of the web page so that only a relatively enlarged image of a faucet remains in the thumbnail image displayed in the graphical toolbar. In at least one implementation, the original thumbnail image 502 (i.e. the original web page appearance) is saved in the tile object 500 together with the zoomed thumbnail image 504.

Although this is not required (memory considerations may warrant not saving the original thumbnail image 502), saving the original thumbnail image 502 allows a user to later expand the thumbnail image from the zoomed thumbnail image 504 without having to revisit the web page to obtain the portions that were cropped to create the zoomed thumbnail image 504.

The tile object 500 also includes a page link 506 to the saved web page, page information 507 saved from the web page, and page metadata 508. Saving the page link allows quick access to return to the web page if and when necessary. The page information 507 can be any subset of metadata that is included in the web page. This can be user selected data from the page (such as price) or it can be all of the data included with the saved web page.

User comments 510 are contained in the tile object 500 and stores user annotations regarding the save web page corresponding to the tile object. For example, a user searching for several faucets (e.g. for multiple bathrooms and a kitchen) can store notes about a location of interest for the item shown in the saved web page.

The tile object 500 also includes a show/hide tile property 512 that is used to determine when the tile represented by the tile object 500 should be displayed. When the show/hide tile property 512 indicates "show", the tile is displayed. Otherwise, the tile is not displayed.

It is noted that the tile object 500 may contain more or fewer elements that shown in FIG. 5 depending on the features of a particular implementation.

Exemplary Group Object

Figure 6:
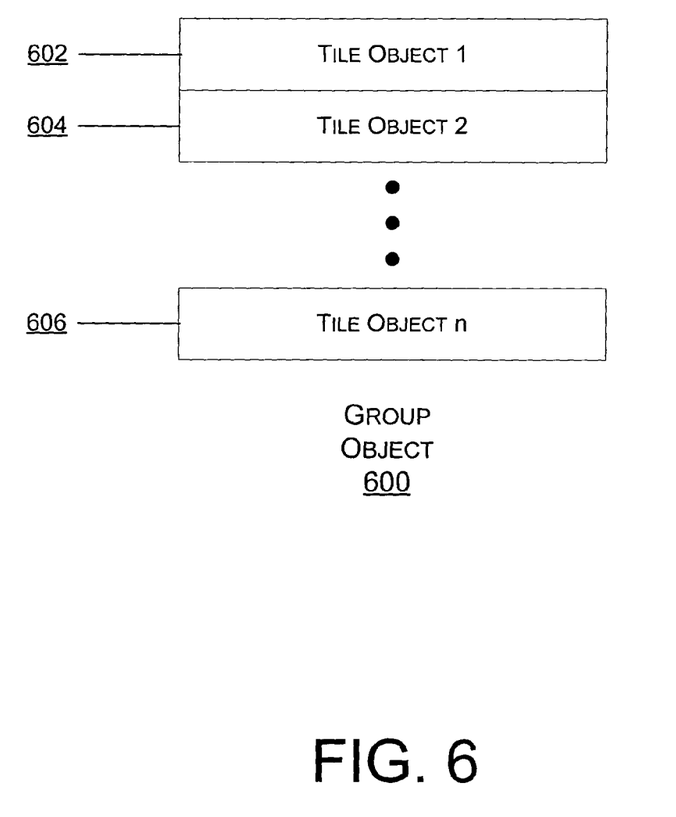
FIG. 6 is a representation of an exemplary group object.

FIG. 6 is a representation of an exemplary group object 600 in accordance with the present description. The group object 600 includes a first tile object 602 ("Tile Object 1"), a second tile object 604 ("Tile Object 2") and a final tile object 606 ("Tile Object n"). The tile objects 602-606 are similar to the tile object 500 shown and described with regard to FIG. 5.

The group object 600 may contain virtually any practical number of tile objects depending on a particular configuration of a group represented by the group object 600. In at least one implementation, the group object 600 may contain a limited number of tile objects 500 (FIG. 5) if the implementation aims to limit a number of tiles that can be displayed within a group. This may be done for display space conservation or for other reasons.

Exemplary Zooming Operation

Figure 7:
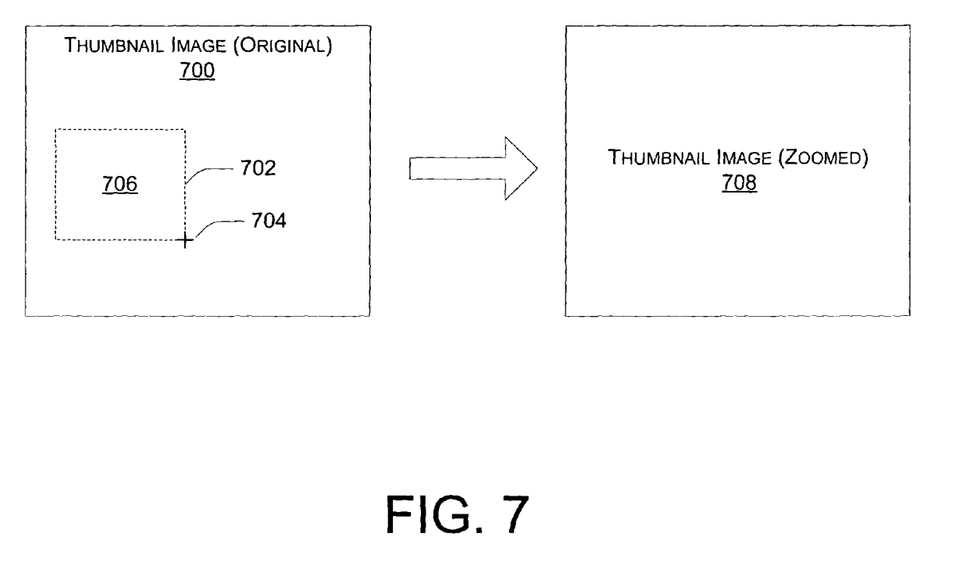
FIG. 7 is a depiction of an exemplary zooming operation for a thumbnail image.
Figure 8:
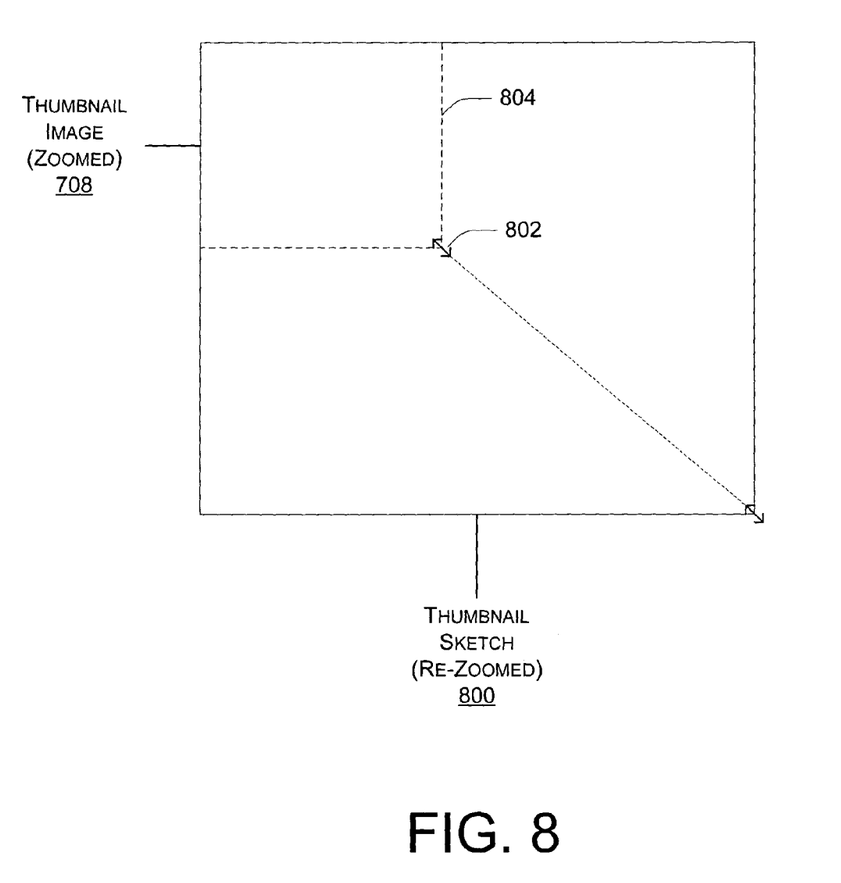
FIG. 8 is a depiction of an exemplary resizing operation for a thumbnail image.

FIG. 7 and FIG. 8 depict an exemplary zooming operation that may be used on an original thumbnail image to create a zoomed thumbnail image. In one or more implementations according to the present description, a zooming operation allows a user to select a certain portion of a web page to preserve in a tile as a representative thumbnail image for the web page. This allows a particular area of the web page to be saved for reference purposes.

In at least one implementation, the size of a thumbnail image in a tile may be user selectable. In such an implementation, a user may conserve display space by using smaller thumbnail images created with the presently described zooming operation.

FIG. 7 shows an original thumbnail image 700 that is created when a user selects a web page for inclusion in a graphical web browser history toolbar. A zoom boundary 702 is shown that is created (at least in this instance) by positioning a cursor 704 in a location on the thumbnail image 700 and dragging the cursor 704 to create a zoomed image area 706.

The zoomed image area 706 becomes a zoomed thumbnail image 708 that is saved in a corresponding tile object (500, FIG. 5). The zoomed thumbnail image 708 is then used as a representative image in a tile of a graphical toolbar.

FIG. 8 shows the zoomed thumbnail image 708 (FIG. 7) and depicts how the zoomed thumbnail image 708 can be re-zoomed to created a re-zoomed thumbnail image 800 that is larger than the zoomed thumbnail image 708. The re-zoomed thumbnail image 800 can be of any size up to and including the size of the original thumbnail image 700 (FIG. 7).

This can be accomplished by re-linking to the web page or by accessing the web page if the web page is included in a tile object (500, FIG. 5). A cursor 802 is placed on an image boundary 804 and the cursor is dragged until the image boundary 804 is at a desired location. The re-zoomed thumbnail image 800 is stored in the memory (404, FIG. 4) and is used to represent the web page in a tile of the graphical toolbar.

In at least one implementation in accordance with the present description, an undo-zoom mechanism (not shown) may be included in a user interface that, when actuated by a user, restores the original thumbnail image 700 (FIG. 7).

Exemplary Operating Environment

Figure 9:
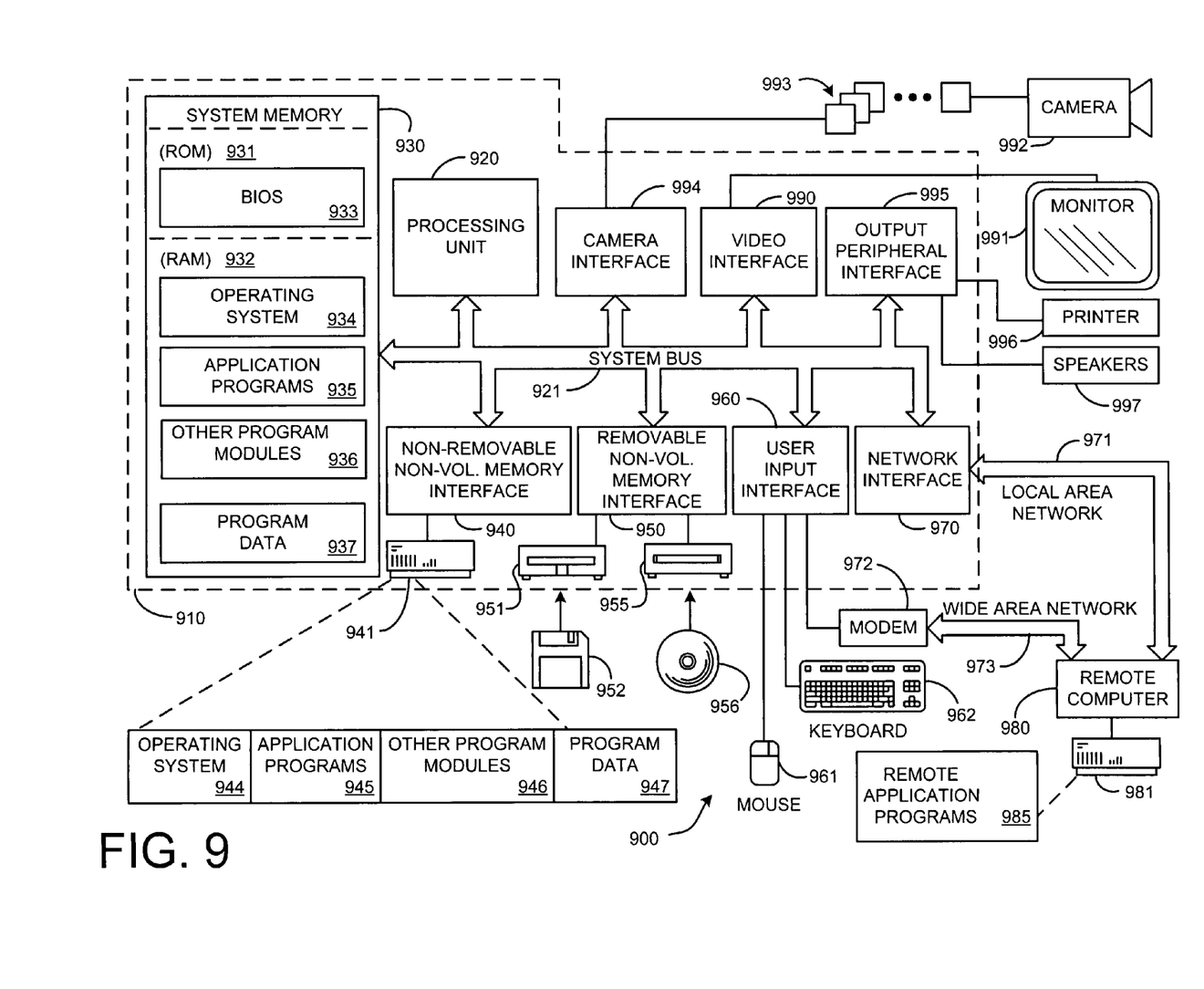
FIG. 9 is a block diagram depicting an exemplary general purpose computing device that may be used in conjunction with one or more described techniques and/or systems.

FIG. 9 is a block diagram depicting a general purpose computing environment 900 that may be used in one or more implementations according to the present description. The computing system environment 900 is only one example of a suitable computing environment and is not intended to suggest any limitation as to the scope of use or functionality of the claimed subject matter. Neither should the computing environment 900 be interpreted as having any dependency or requirement relating to any one combination of components illustrated in the exemplary operating environment 900.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a modulated data signal such as a carrier wave or other transport mechanism includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through anon-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995. Of particular significance to the present invention, a camera 963 (such as a digital/electronic still or video camera, or film/photographic scanner) capable of capturing a sequence of images 964 can also be included as an input device to the personal computer 910. Further, while just one camera is depicted, multiple cameras could be included as an input device to the personal computer 910. The images 964 from the one or more cameras are input into the computer 910 via an appropriate camera interface 965. This interface 965 is connected to the system bus 921, thereby allowing the images to be routed to and stored in the RAM 932, or one of the other data storage devices associated with the computer 910. However, it is noted that image data can be input into the computer 910 from any of the aforementioned computer-readable media as well, without requiring the use of the camera 963.

Figure 10:
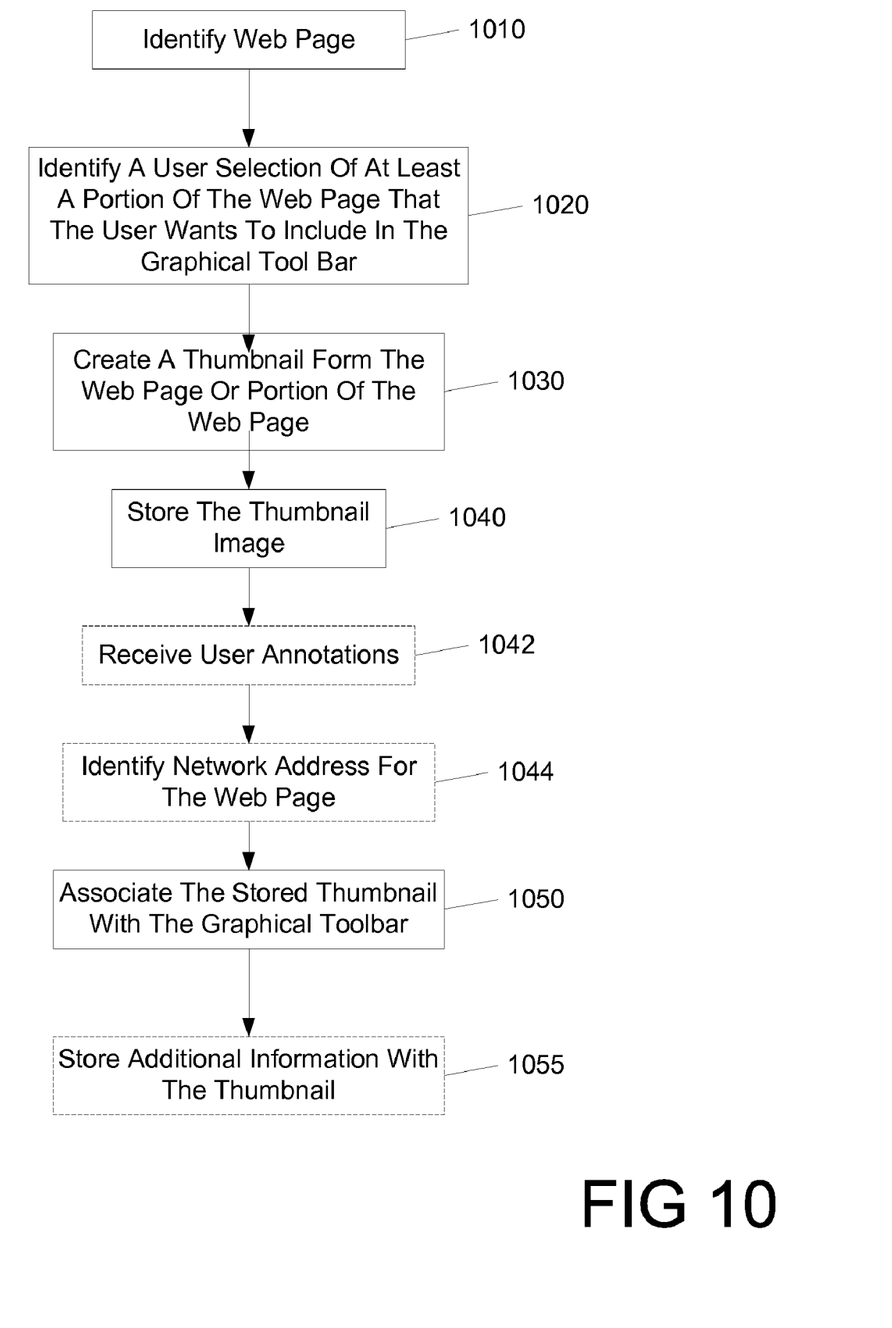
FIG. 10 is a flow chart illustrating an exemplary method according to one embodiment.

FIG. 10 is a flow diagram illustrating an exemplary method according to one embodiment of the present disclosure. A web page is identified at step 1010. A user selection of at least a portion of the web page that indicates a portion of the web page that the user wants to include in a graphical tool bar is identified at step 1020. A thumbnail image is created from the web page or portion of the web page at step 1030. The thumbnail image is stored in memory at step 1040. In some embodiments user annotations associated with the web page are received. This is illustrated by optional step 1042. In other embodiments a network address of the web page is identified. This is illustrated by optional step 1044. The stored thumbnail image is associated with the graphical toolbar so that the thumbnail image is displayed with the graphical tool bar at step 1050. If steps 1042 or 1044 are performed the information contained in them are stored with the thumbnail image at optional step 1055.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

CONCLUSION

While one or more exemplary implementations have been illustrated and described, it will be appreciated that various changes can be made therein without departing from the spirit and scope of the claims appended hereto.

The invention claimed is:

1. A method performed by a web browser executing on a computing device, the method comprising:
  displaying web pages acquired by the browser via a network from remote servers, the browser comprising a main display area where the web pages are displayed and where a user can interact with a currently displayed web page to activate interactive controls therein that are part of the web page, the browser further comprising a history display area displayed simultaneously with the main display area, the history display area displaying thumbnails of stored previously-visited web pages, wherein when a thumbnail is selected a copy or partial copy of the web page is retrieved from one of a plurality of web page records and displayed in the main display area with user interface elements for inputting a comment and a display area displaying a price extracted from the displayed copy or partial copy of the web page;
  storing the web page records for at least some of the web pages, respectively, a web page record having been stored responsive to the user interacting with the browser to invoke a store command when the corresponding web page was displayed in the main display area, whereby the store command is used to store only some of the visited web pages, each web page record comprising an address of the corresponding web page, a thumbnail of the corresponding web page, a copy or partial copy of the corresponding web page, and a price extracted from the corresponding web page, wherein when the user interacts with the web browser to invoke the store command to indicate that a web page currently displayed in the main display area is to be stored, the browser, while displaying the web page in the main display area, adds and displays a thumbnail of the current web page in the history display area and stores a new web page record for the current web page;
  responding to the user selecting a thumbnail displayed in the history display area by obtaining a corresponding stored web page record and displaying the copy or partial copy of the web page in the main display area, and displaying a data input area comprising a comment input area for receiving user-inputted comments, a data field for displaying a price extracted from the displayed copy or partial copy of the web page responsive to user interaction therewith, wherein the extracted price and the user-inputted comments are stored in the corresponding web page record, and the extracted price is extracted and stored in the web page record in response to the user interactively selecting the price in the corresponding display of web page in the main display area;

storing groupings of the web page records, the groupings having been interactively created by the user using the browser, the web browser allowing the user to define new groupings and add any of the stored web page records to any of the groupings; and while displaying the main display area and the history display area, displaying a grouping display area in the browser, the grouping display area comprising individual group icons of respective groupings, an icon of a grouping being comprised of thumbnails of web pages in the grouping, wherein, when a user selects an icon, a total of the prices of the web pages in the grouping is displayed and the thumbnails of the web page records in the corresponding grouping are automatically displayed in the history display area such that any of the thumbnails of the grouping can be interactively selected to display a corresponding copy or partial copy of a corresponding web page record in the main display area.

2. The method according to claim 1, wherein a thumbnail comprises an image configured such that a portion of the image may be selected to create a zoomed thumbnail image which is subsequently used to graphically represent the electronic page.

3. The method according to claim 1, wherein the web browser further comprises a data summary area that displays the total of the prices of the web page records in a currently selected grouping of web page records.

4. The method as recited in claim 1, further comprising:
identifying a network address of a web page; and
storing the network address with the thumbnail in the corresponding web page record so that the network address is displayed as an actuatable link with the thumbnail image.

5. The method as recited in claim 1, wherein the web browser is further configured to:
receive user annotations related to the currently displayed web page; and
store the user annotations with the corresponding thumbnail so that the user annotations are displayed when the thumbnail image is displayed.

6. A computing device comprising a processor and storage media storing a web browser, the web browser configured to perform a process comprising:
displaying web pages selected by a user and acquired by the browser via a network from remote servers, the browser comprising a main display area where the acquired web pages are displayed and where the user can interact with a currently displayed web page to activate interactive components therein that are included in the acquired web page, the browser further comprising a history display area displayed simultaneously with and separately from the main display area, the history display area displaying interactive thumbnails of stored previously-visited web pages, wherein when a thumbnail is interactively selected a copy or partial copy of the web page represented by the selected thumbnail is retrieved from one of a plurality of stored web page records and displayed in the main display area with user interface elements for inputting a comment and for displaying a price extracted from the displayed copy or partial copy of the web page;

storing and accessing the web page records, which correspond to respective web pages, a web page record having been selectively stored by the browser responsive to the user interacting with the browser to invoke a store operation when the corresponding web page was displayed in the main display area, whereby the user interactively chooses only a subset of visited web pages to be stored and a displayed current web page is stored only if the user invokes the store operation, each web page record comprising an address of the corresponding web page, a thumbnail of the corresponding web page, a copy or partial copy of the corresponding web page, and data extracted from the web page, wherein when the user interacts with the web browser to invoke the store operation to indicate that a web page currently displayed in the main display area is to be stored, the web page having been retrieved directly from a server and not from a locally stored web page record, the browser, while displaying the web page in the main display area, adds and displays a thumbnail of the current web page in the history display area and stores a new web page record for the current web page;

responding to the user selecting a web page record thumbnail displayed in the history display area by accessing a corresponding stored web page record and displaying the copy or partial copy of the web page in the main display area, and also in response to the selecting the web page record thumbnail, displaying in the main display area a data input area comprising a comment input area for receiving user-inputted comments, a data field for displaying text data extracted from the displayed copy or partial copy of the web page responsive to user interaction therewith, wherein extracted data and user-inputted comments are stored in the corresponding web page record;

storing groupings of the web page records; and while displaying the main display area and the history display area, displaying a grouping display area in the browser, the grouping display area separate from the main display area and the history display area, the grouping display area comprising individual group icons of respective groupings, a group icon being comprised of thumbnails of web pages in the grouping, the groupings having been interactively created at least in part by a user using the browser to drag a thumbnail out of one group icon in the grouping display area and into another group icon in the grouping display area, wherein responsive to a user selecting a group icon, a total of the prices of the web page records in the selected grouping is computed and displayed, and the thumbnails of the web page records in the corresponding grouping are retrieved and displayed in the history display area and any of the so-displayed thumbnails of the grouping can be interactively selected to cause a corresponding copy or partial copy of a corresponding web page record to be displayed in the main display area.

7. The computing device according to claim 6, wherein some of the thumbnails in the web page records comprise original images of the respective web pages.

8. The computing device as recited in claim 6, wherein the browser is further configured to:
identify an address associated with a web page, the address comprising a URL;
store the address with the thumbnail in the corresponding web page record;
display the address with the thumbnail when displaying the thumbnail in the history display area;

identifying a user actuation of the address in the history display area and in response the web browser navigating to the web page associated with the web page address.

* * * * *